United States Patent
Carter et al.

(10) Patent No.: US 9,760,897 B2
(45) Date of Patent: Sep. 12, 2017

(54) METHOD AND SYSTEM FOR DEFINING AN OFFLINABLE VIEW/CONTROLLER GRAPH

(71) Applicant: Oracle International Corporation, Redwood Shores, CA (US)

(72) Inventors: Wayne Carter, San Francisco, CA (US); Donald Creig Humes, Yorktown, VA (US)

(73) Assignee: Oracle International Corporation, Redwood Shores, CA (US)

( * ) Notice: Subject to any disclaimer, the term of this patent is extended or adjusted under 35 U.S.C. 154(b) by 987 days.

(21) Appl. No.: 14/068,298

(22) Filed: Oct. 31, 2013

(65) Prior Publication Data

US 2015/0088602 A1 Mar. 26, 2015

Related U.S. Application Data

(60) Provisional application No. 61/880,898, filed on Sep. 21, 2013.

(51) Int. Cl.
*H04M 3/42* (2006.01)
*G06Q 30/02* (2012.01)
*G06F 17/30* (2006.01)

(52) U.S. Cl.
CPC ... *G06Q 30/0201* (2013.01); *G06F 17/30126* (2013.01); *G06F 17/30902* (2013.01)

(58) Field of Classification Search
CPC .......... G06Q 30/0201; G06F 17/30126; G06F 17/30902

USPC .......................................................... 455/414
See application file for complete search history.

(56) References Cited

U.S. PATENT DOCUMENTS

| | | | |
|---|---|---|---|
| 6,591,266 B1 * | 7/2003 | Li | G06F 17/30902 |
| 6,597,379 B1 * | 7/2003 | Morris | G06Q 10/06 |
| | | | 707/999.004 |
| 7,499,935 B2 * | 3/2009 | Lawrence | G06F 17/30528 |
| 8,978,075 B1 * | 3/2015 | Kaiser | H04N 5/44 |
| | | | 725/105 |
| 9,456,335 B2 * | 9/2016 | Carter | H04W 4/001 |
| 2001/0051949 A1 * | 12/2001 | Carey | G06F 17/3041 |
| 2007/0078950 A1 * | 4/2007 | Hopkins | G06F 17/30861 |
| | | | 709/217 |
| 2010/0257230 A1 * | 10/2010 | Kroeger | H04L 67/2861 |
| | | | 709/203 |
| 2013/0246944 A1 * | 9/2013 | Pandiyan | G06F 9/54 |
| | | | 715/760 |

* cited by examiner

*Primary Examiner* — Amancio Gonzalez
(74) *Attorney, Agent, or Firm* — Sheppard Mullin Richter & Hampton LLP

(57) ABSTRACT

A method and system for defining an offlinable view/controller graph. In one embodiment of the method a first view definition is received from a server via data communication link, wherein the first view definition comprises a first identifier. The first view definition is stored in memory at a location identified by a first universal resource locator (URL). The first URL is mapped to the first identifier in a table.

20 Claims, 8 Drawing Sheets

| | View Table | | 700 |
|---|---|---|---|
| Entry | File System URL | View URI | |
| 1 | file://...accounts # list | view://accounts # list | |
| 2 | — | view://accounts/101#details | |
| 3 | file://...accounts/102#details | view://accounts/102#details | |
| 4 | — | view://accounts/103#details | |

View Table        700

| Entry | File System URL | View URI |
|---|---|---|
| 1 | file://...accounts # list | view://accounts # list |
| 2 | — | view://accounts/101#details |
| 3 | file://...accounts/102#details | view://accounts/102#details |
| 4 | — | view://accounts/103#details |
| 5 | file://...contacts # list | view://contacts # list |
| 6 | — | view://contacts/101#details |
| 7 | — | view://contacts/102#details |
| 8 | — | view://contacts/103#details |
| 9 | — | view://contacts/104#details |

*FIG. 7B*

View Table        700

| Entry | File System URL | View URI |
|---|---|---|
| 1 | file://...accounts # list | view://accounts # list |
| 2 | — | view://accounts/101#details |
| 3 | file://...accounts/102#details | view://accounts/102#details |
| 4 | — | view://accounts/103#details |
| 5 | file://...contacts # list | view://contacts # list |
| 6 | file://...contacts/101#details | view://contacts/101#details |
| 7 | — | view://contacts/102#details |
| 8 | — | view://contacts/103#details |
| 9 | — | view://contacts/104#details |

*FIG. 7C*

METHOD AND SYSTEM FOR DEFINING AN OFFLINABLE VIEW/CONTROLLER GRAPH

RELATED APPLICATIONS

This application claims the domestic benefit under Title 35 of the U.S. Code §119(e) of U.S. Provisional Patent Application Ser. No. 61/880,892, entitled "Method and System for Defining an Offlinable View/Controller Graph," filed Sep. 21, 2013, which is hereby incorporated by reference in its entirety and for all purposes as if completely and fully set forth herein.

BACKGROUND OF THE INVENTION

Enterprise applications provide valuable services to businesses. For example, enterprise applications provide customer relationship management (CRM), resource planning, human resource management, etc. The present invention will be described with reference to an example CRM that provides sales and marketing services, it being understood that the present invention should not be limited thereto.

CRM is a widely implemented strategy for managing a company's interaction with customers. CRM services can be accessed through mobile devices (e.g., smart phones or tablet computers). The present invention will be described with reference to providing CRM services to users via their mobile devices, it being understood the present invention should not be limited thereto.

SUMMARY

A method and system for defining an offlinable view/controller graph is disclosed. In one embodiment of the method, a first view definition is received from a server via data communication link, wherein the first view definition comprises a first identifier. The first view definition is stored in memory at a location identified by a first universal resource locator (URL). The first URL is mapped to the first identifier in a table.

BRIEF DESCRIPTION OF THE DRAWINGS

The present invention may be better understood, and its numerous objects, features, and advantages made apparent to those skilled in the art by referencing the accompanying drawings.

FIG. 6 is a block diagram illustrating relevant components of an example mobile device.

FIGS. 7A-7C graphically illustrates an example view table stored in the mobile device employed of FIG. 6.

The use of the same reference symbols in different drawings indicates similar or identical items.

DETAILED DESCRIPTION

Today's sales workforce is more mobile than ever. To better aid the mobile sales workforce, many companies employ mobile CRM, which enables users to more efficiently use CRM services such as creating, reviewing, and/or updating sales opportunities, sales accounts, contacts, etc., through user interfaces or "views" displayed on mobile devices.

Figure 1:
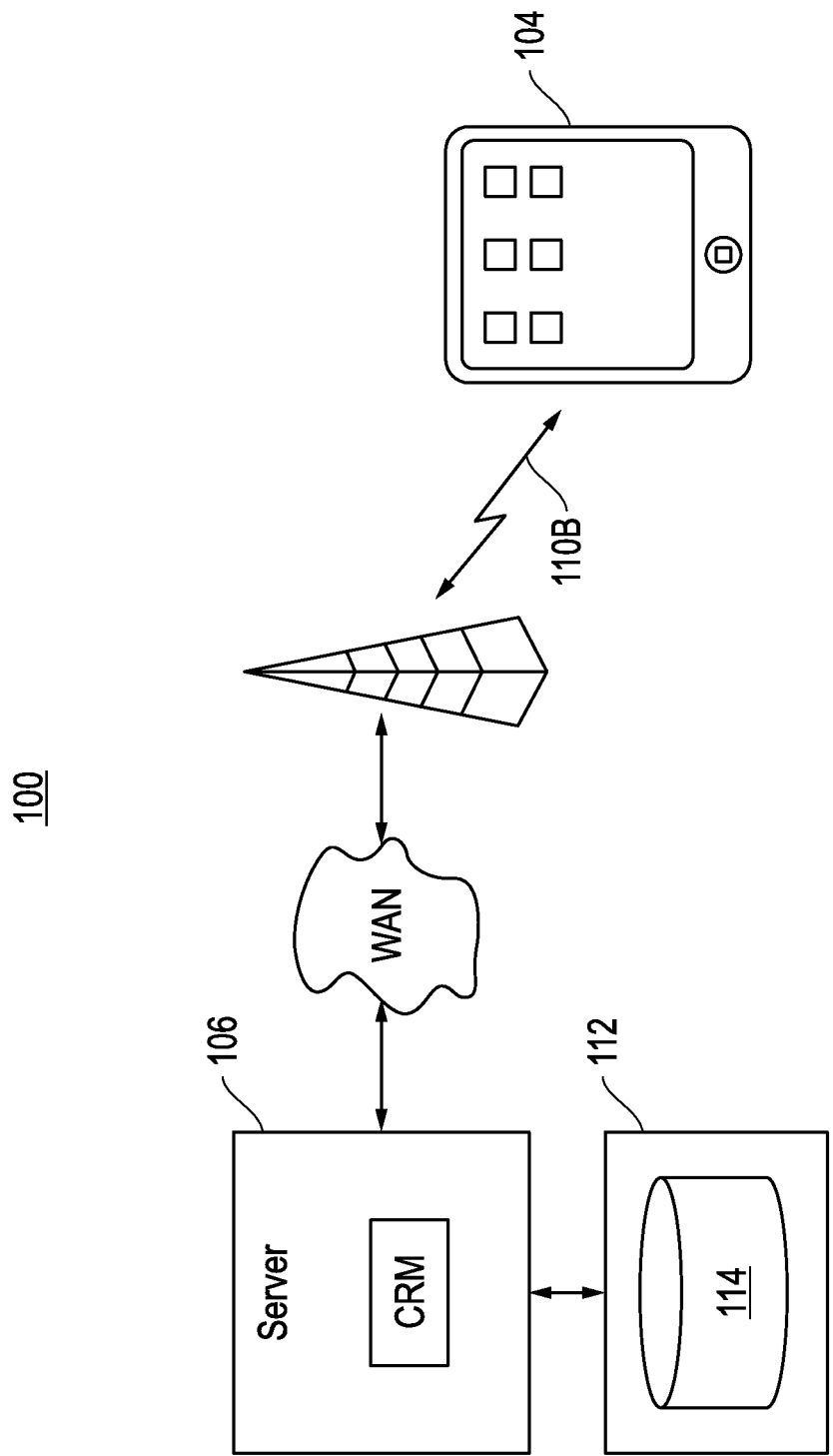
FIG. 1 is a block diagram illustrating relevant components of an example system that employs mobile CRM.

FIG. 1 illustrates in block diagram form, relevant components of an example system 100 that provides mobile CRM. System 100 includes a mobile device (e.g., smart phone) 104 in wireless data communication with a CRM executing on server 106. Services provided by the CRM can be accessed through views displayed by mobile device 104.

In one embodiment, the CRM implements a model-view-controller architecture. The CRM includes a single, state driven application that contains multiple page definitions, which form the basis of views that can be are displayed by mobile device 104. In response to receiving a view request from mobile device 104, the CRM merges or binds view components (e.g., account names, contact names, etc.) from a logical data model with a selected page definition, the result of which is sent to the mobile device 104 as a view definition in a reply after additional processing (e.g., rendering, Uniform Resource Identifier (URI) insertion, and/or serialization). Mobile device 104 receives and renders the view definition for display. For purposes of explanation, this disclosure presumes that any view definition received by a mobile device contains merged view components (e.g., account names, contact names, etc.) in condition for rendering and subsequent display. Mobile device may perform preprocessing (e.g., deserialization) before the view definition is rendered for subsequent display.

Figure 2:
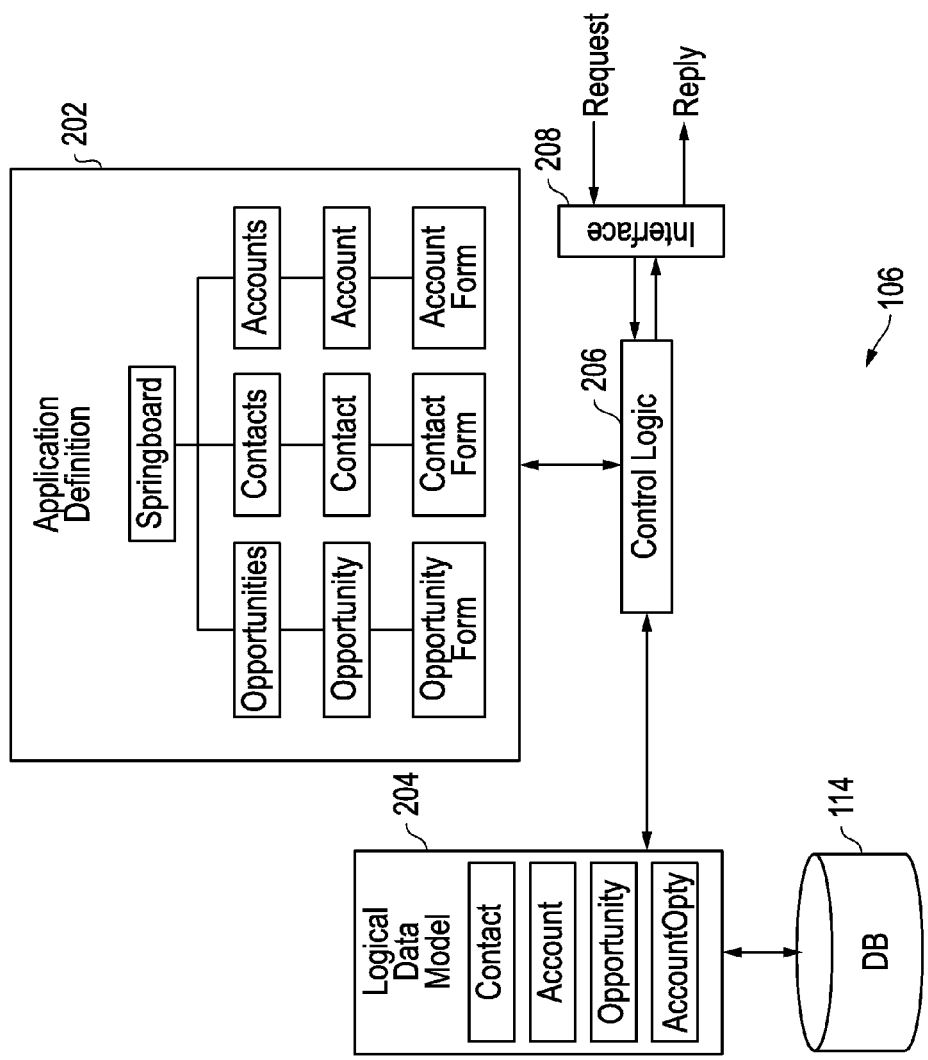
FIG. 2 is a block diagram of relevant components of an example server employed in FIG. 1.

With continuing reference to FIG. 1, FIG. 2 illustrates an example of server 106 with relevant components shown in block diagram form. Memory 202 stores an application definition for the CRM. The application definition includes page definitions, some of which are represented in memory 202. The "Springboard" page definition can be used to render a springboard view for display on a mobile device, which enables user access to mini-applications or high level business objects within the logical data model. The "Accounts," "Opportunities," and "Contacts" page definitions can be used to render views for display on mobile devices that present names of accounts, opportunities, and contacts, respectively, in a list pattern. The "Account," "Opportunity," and "Contact" page definitions can be used to render views for display that provide detailed information for an account, opportunity, and contact, respectively, in a form. The "Account Form," "Opportunity Form," and "Contact Form" page definitions can be used to render views for display that provide information from an account, opportunity, and contact, respectively, in a user editable form. Other page definitions in memory 202 are contemplated. In general, page definitions can be used to render logical data model 204 into a form suitable for interaction by a user of a mobile device via views displayed thereon. In one sense, logical data model 204 provides access to business objects including accounts, contacts, opportunities, etc., some of which are shown in FIG. 2.

The application definition in memory 202 can be implemented as a state driven application that is built using Java Server Faces (JSF) technology, it being understood the present invention should not be limited thereto. JSF provides standard, reusable components for creating pages for views. JSF provides useful, special tags to enhance view definitions. As will be more fully described below, the present invention can extend JSF (or a similar technology for building a state driven application) with a new feature that enables insertion of a new type of tag (e.g. URIs) into view definitions before the view definitions are sent to mobile devices. These new tags, as will be more fully described below, enable multiple features. For example, the tags allow mobile devices to display views when the mobile devices are "offline" or lack data communication with the CRM.

Control logic 206, which may take form in instructions executing on a processor, is in data communication with the application definition. Control logic 206 can receive a view request from mobile device 104 via interface 208. In response to receiving the view request, control logic 206 may access the application definition in memory 202 or a view navigation stack (not shown) to select an appropriate page definition for creating the reply. The page definition can be selected based on information contained in the view request in addition to other information.

Figure 3:
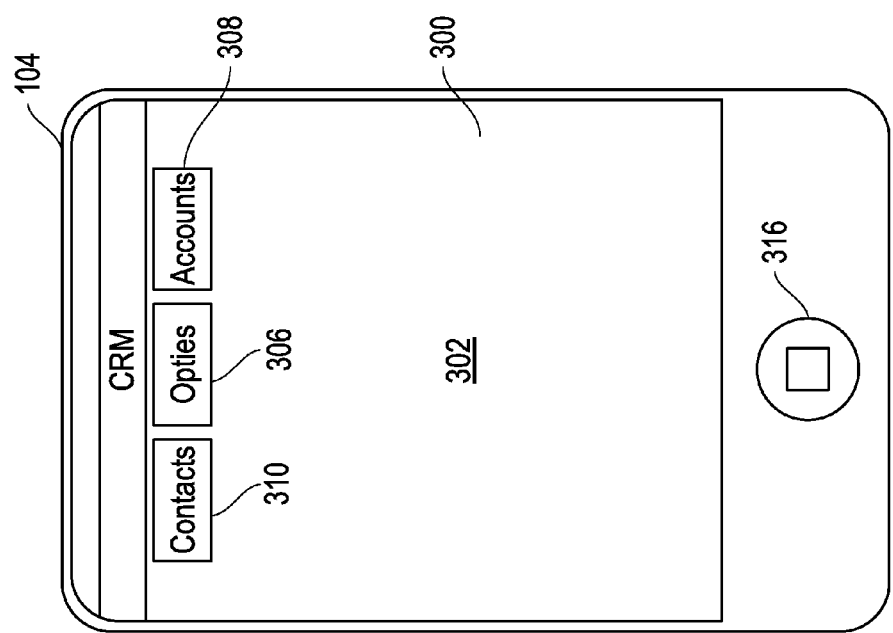
FIG. 3 graphically illustrates an example page displayed on a mobile device employed in FIG. 1.
Figure 5:
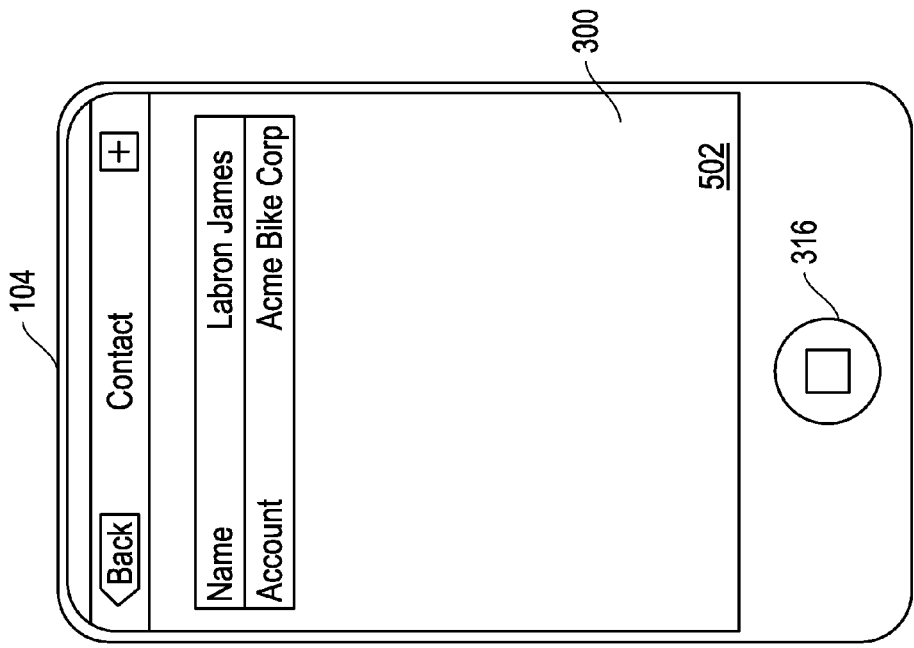
FIG. 5 graphically illustrates an example page displayed on a mobile device employed in FIG. 1.
Figure 4:
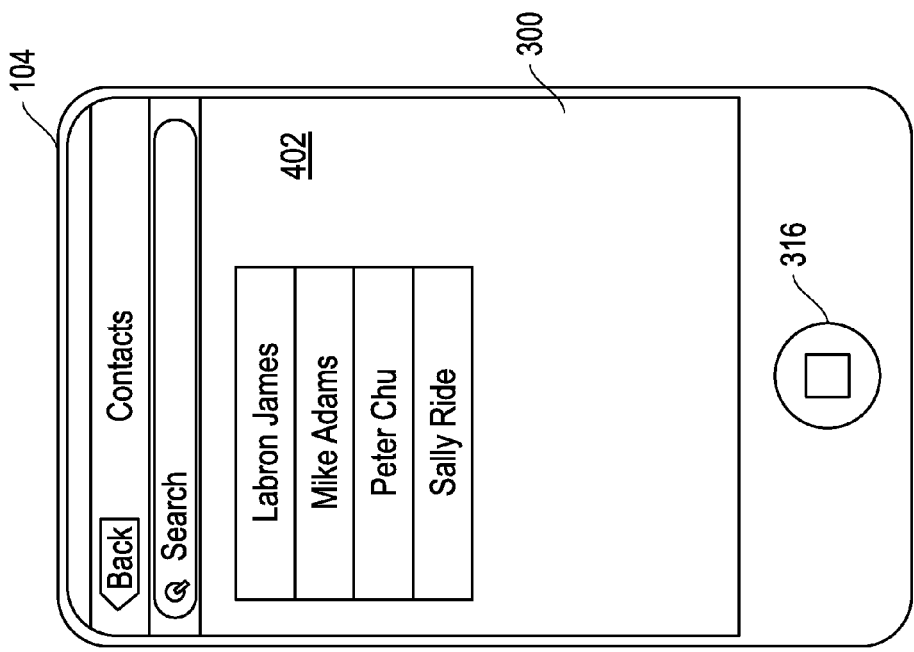
FIG. 4 graphically illustrates an example page displayed on a mobile device employed in FIG. 1.

The page definition contains metadata that can be used to retrieve view components (e.g., account names, contact names, etc.) needed from logical data model 204. Control logic 206 can make calls to logical data model 204 to retrieve the needed view components. Control logic 206 can then bind or merge the selected page definition with the retrieved components, the result of which is transmitted to the requesting mobile device as a view definition in a reply after some additional processing. FIGS. 3-5 illustrate example views that are displayed by mobile device 104 in response to receiving replies from the CRM.

With continuing reference to FIG. 2, FIG. 3 illustrates an example view 302 that is displayed on a touch sensitive screen 300 of mobile device 104 in response to a user's initial invocation of a mobile session with the CRM. More particularly, when the user invokes the mobile session, mobile device 104 generates and sends a request for a springboard view. In response to receiving the request, control logic 206 selects the springboard page definition in memory 202. After some processing, control logic 206 sends the springboard view definition to the mobile device in a reply. Mobile device 104 receives and subsequently displays view 302 with actionable springboard view components 306-310 in response.

When springboard view 302 is displayed on mobile device 104, the user can request additional, related views for display on mobile device 104 via activation of components 306-310. To illustrate, the user can activate "Contacts" in order to retrieve a list of the contacts from the CRM. In response to activation of Contacts, mobile device 104 generates and sends a request for the contacts view to the CRM. View requests may include a session identification or other information that uniquely identifies the session between the CRM and mobile device 104. The CRM and/or control logic 206 can use session identifications to manage view navigation stacks for respective mobile devices, which in turn can be used to select the proper page definition and components needed to form the reply.

Continuing with the illustrated example, control logic 206 receives the contacts list view request from mobile device 104, and in response selects the contacts page definition from memory 202. Control logic 206 selects and merges view components (e.g., contact names) from model 204 that are needed for the reply. The component selection may be based on information in the selected page definition and/or other information. In the current example, control logic 206 selects contact names that are identified directly or indirectly by the contact page definition. Components selected and retrieved are merged by control logic 206 with the contacts page definition, the result of which is transmitted to mobile device 104 as a contacts view definition after some additional processing. This additional processing may include, but should not be limited to, control logic 206 selectively adding view URIs and/or target view URIs based on the contents of the merged page definition or a rendered, merged page definition. A portion of an example contacts view definition sent to mobile device 104 is provided below.

---

Contacts View Definition

---

```
<
    <list>
        <entry action="contacts?__ctrl.state=zxy1&source=abc"
        targetUri="view:/contacts/101#detail"
            >Labron James</entry>
        <entry action="contacts?__ctrl.state=zxy1&source=def"
        targetUri="view:/contacts/102#detail"
            >Mark Adams</entry>
        <entry action="contacts?__ctrl.state=zxy1&source=ghi"
        targetUri="view:/contacts/102#detail"
            >Peter Chu</entry>
        <entry action="contacts?__ctrl.state=zxy1&source=jkl"
        targetUri="view:/contacts/102#detail"
            >Sally Ride</entry>
        ...
    </list>

```

---

FIG. 4 shows an example "Contacts" view 402 displayed by mobile device 104 after it receives the reply from CRM. Like other views presented in a list pattern, view 402 illustrates contact names in a list. Many components displayed in a view are actionable. For example, the "Labron James" component can be user activated (e.g., "clicked") to request a corresponding view that provides contact details for Labron James. In response to activation, mobile device 104 generates and sends a request for the Labron James detail view to the CRM. Control logic 206 receives this request, and selects the Contact page definition based on information in the request. Control logic 206 selects components (e.g., the account associated with the contact) identified directly or indirectly by the Contact page definition. The selected components are merged with the Contact page definition, URIs are added, and the result is transmitted to mobile device 104 after some additional processing. A portion of an example contact view definition for Labron James received by mobile device 104 is provided below.

---

Labron James Contact View Definition

---

```
<page title="Contact" subtitle="Labron James"
viewUri="view:/contacts/101#detail">
    <form>
        <entry label="Name">Labron James</entry>
        <entry label="Account" action="contact?__ctrl.state=zxy2&source=abc"
            targetUri="view:/accounts/201#detail">Acme Bike Corp.</entry>
        ...
    </form>

```

---

Like the contacts view definition example, the contact view definition example includes view and target view URIs. As will be more fully described, mobile devices, like mobile device 104, can store view definitions from the CRM, like the contacts and LaBron James contact view definition examples above, in local memory to enable offline rendering and display of views. The view and target view URIs provide a graph or relationship between views, view components and view definitions so that a user can navigate between and views on his mobile device even when the user's mobile device is offline. Target view URIs are linked to actionable components within view definitions. When a user clicks a displayed view component while the mobile device is offline, a view definition identified by a target view URI and linked to the displayed view component, can be retrieved from local memory and subsequently rendered for display.

FIG. 5 shows an example of the Labron James contact view 502 displayed by mobile device 104 after it receives and renders the reply from the CRM. View 502 illustrates detail contact components displayed in a form format. View 502 has a look and feel of other views displayed by mobile device 104 such as the view 402 shown in FIG. 4. For example, both views 402 and 502 include a "Back" button that can be used to backward navigate to a prior view. If the Back button of view 502 is activated, mobile device 104 will generate and send a back request to the CRM. In one embodiment, the same generic back request is sent by mobile device 104 whenever any back button in any view is activated. In response to the back request, the control logic 206 can pop the last item off the view navigation stack, which item includes information related to view 502. Then, control logic 206 can recreate the reply that resulted in view 402, using the page definition (e.g., Contacts page definition) in the most recently added stack item, and components from the model. The reply is recreated for subsequent transmission to the mobile device 104. The redisplay of the view should be the same except for any component from the logical data model that has changed in the interim.

Most of the time, mobile devices such as mobile device 104 shown in FIG. 1 are in data communication with the CRM such as the CRM executing on server 106. While "online" or in data communication, mobile device can receive view definitions from the CRM. However, data communication between the CRM and a mobile device may be interrupted either voluntarily or involuntarily. For example, mobile device 104 may have a feature (e.g., "airplane mode") that allows the user to disable wireless communication, or the mobile device may be too far away from a communication tower to exchange radio signal communications. Mobile device users prefer to have access to CRM data and services when their mobile devices are voluntarily or involuntarily offline.

Figures 6, 7A:
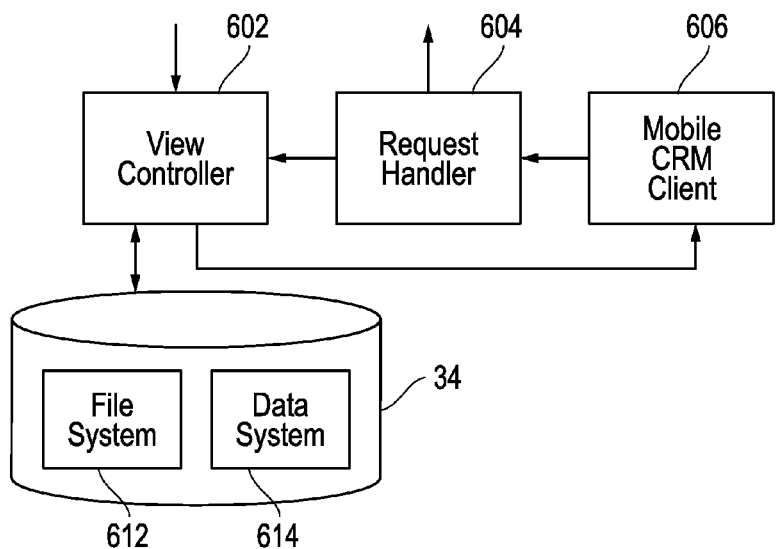

FIG. 6 illustrates relevant components of mobile device 104 that enables offline access to CRM data and/or services. More particularly, FIG. 6 shows, in block diagram form, a view request handler 604 in data communication with a view controller 602 and a mobile CRM client 606. In one embodiment, components 602-606 may take form in instructions executing on one or more processors of mobile device 104. Additionally, FIG. 6 shows a memory subsystem 610 that is configured to store a file system 612 and a data store 614. In one embodiment, data store 614 may take form in a database that stores one or more tables such as a view table more fully described below.

Mobile CMR client 606 generates requests for views, such as the request for the contacts view mentioned above, in response to user activation of displayed, actionable view components. Request handler 604 receives the requests and is configured to forward the requests to the CRM if the mobile device 104 is online or in data communication with the server 106. Otherwise, request handler 604 forwards the view requests to view controller 602 as will be more fully described below.

If the mobile device is online, view controller 602 is configured to receive a request reply from server 106 that contains a view definition such as the contacts view definition example above. View controller 602 stores a copy of the view definition in file system 612, and links the view URI for the view definition to the stored copy. In one embodiment, view controller 602 creates and/or accesses a view table within data store 614 that maps view URIs to respective URLs or addresses for view definitions stored in file system 612. View controller 602 is also configured to provide view definitions to mobile CRM client 606 on request when mobile device 104 is in the offline mode as will be more fully described below.

FIG. 7A illustrates an example view table 700 contained within data store 614. This view table contains entries that map view URIs to file system URLs, which identify respective locations within file system 612 where view definitions are stored. The view table shown in FIG. 7A is accessible by the view controller. As shown in the example of FIG. 7A, view table 700 includes four entries, only one of which maps a URI to a file system URL. For purposes of explanation, FIG. 7A represents the state of view table 700 prior to mobile device 104 requesting the contacts view definition and the Labron James contact view definition set forth above.

Figure 8:
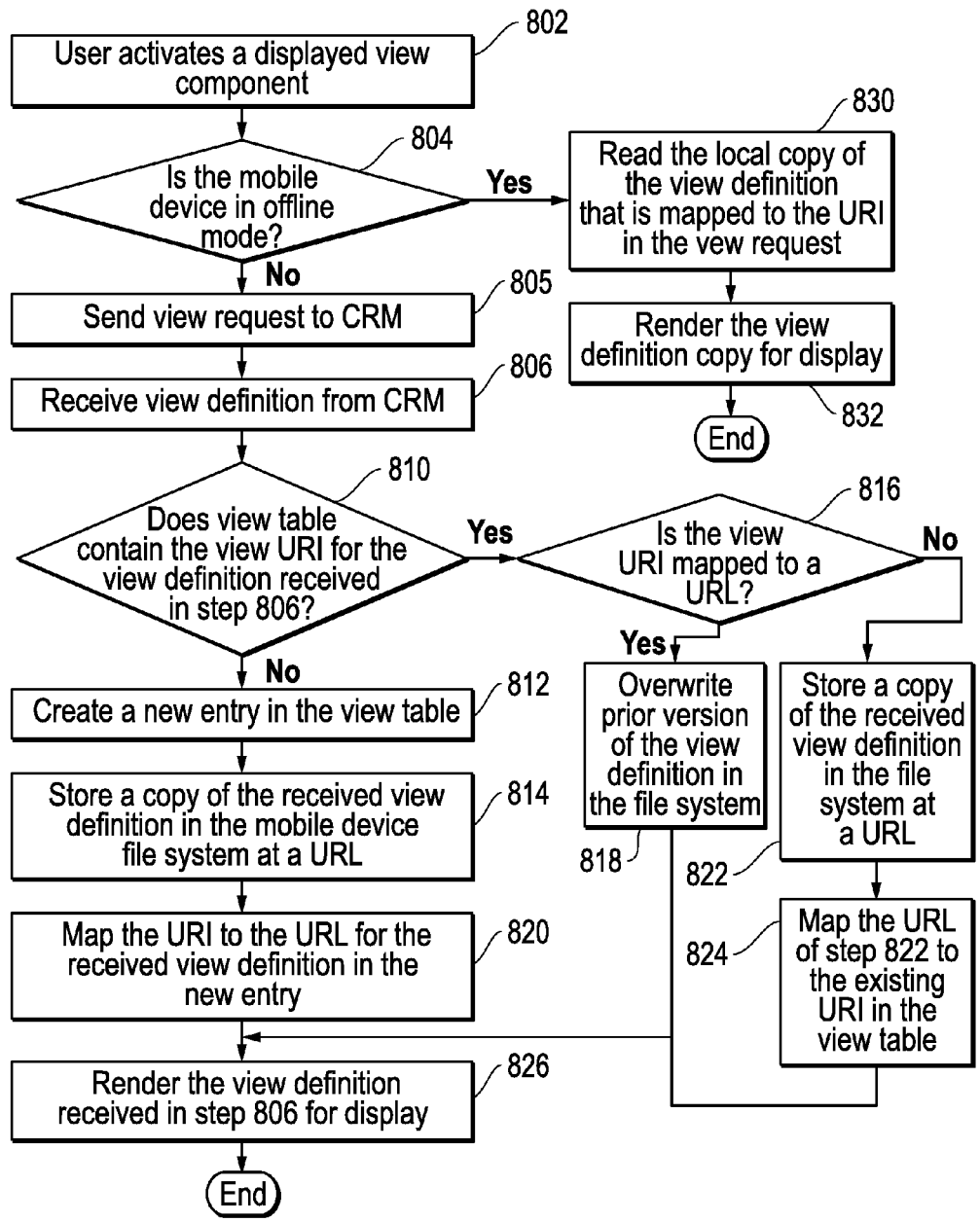
FIG. 8 is a flow chart illustrating relevant aspects of a process implemented by the mobile device of FIG. 6.

FIG. 8 illustrates an example process employed by the view controller 602 and request handler 604 to enable offline access to CRM data and/or services. The process begins when a user of mobile device 104 activates (e.g., clicks) a displayed, actionable view component of a rendered view definition. The view component may be linked to a separate view definition via a target view URI in the rendered view definition. In response to user activation, the mobile CRM client 606 generates a view request corresponding to the activated view component. If the activated view component is linked to a target view URI, the URI from the rendered view definition may be included in the request generated by the mobile CRM client 606.

Request handler 604 receives the view request and determines whether mobile device 104 operates in the online mode. If mobile device 104 is operating in the online mode, the process proceeds to step 805 where handler 604 sends the request to the CRM. In response view controller 602 will receive a reply from CRM that contains a view definition as shown in step 806. The view definition should contain and is identified by a unique view URI. The view definition may also contain one or more target view URIs that link components (e.g., contacts) in the view definition to respective view definitions.

The view definition received in step 806 is subsequently processed by view controller 602. More particularly, view controller 602 accesses the view table 700 to determine whether it contains the view URI for the view definition. If the view table lacks an entry containing the view URI, view controller 602 creates a new entry, and adds the view URI to the new entry. The view definition received in step 806 is stored, in one embodiment, in a file identified by a unique URL within file system 612. The view controller 602 maps this URL to the view URI in the new entry of the view table as shown in step 820. In one embodiment, certain views do not warrant storage in the mobile device, and as a result view storage on the mobile device is selective. For example views showing up to date stock prices or weather reports are not stored.

If the view controller 602 determines in step 810 that the view table contains the view URI for the received view definition and a mapped URL thereto, thus indicating file system 612 contains a prior version of the view definition received in step 806, the prior version of the view definition stored at the URL is overwritten with the view definition received in step 806. On the other hand if the view table 700 contains the view URI for the view definition received in step 806, but the view URI in the table is not mapped to a URL, then the view definition received in step 806 is stored in file system 612 at a unique URL in step 822. View table 700 is then updated with the URL of step 822. The view definition received in step 806 may contain one or more target view URIs. Although not shown in FIG. 8, view controller 602 creates a new entry in view table 700 for each target view URI that is not present in the view table.

After step 818, 820, or 824 the view definition received from the CRM in step 806 is sent to the mobile CRM client 606 for rendering and subsequent display on the mobile device 104, and the process of FIG. 8 ends.

Mobile device 104 may be in the offline mode when the request handler 604 receives the view request from the mobile CRM client 606. If the mobile device is in the offline mode, then the request handler 604 forwards the view request to view controller 602. This request should contain a view URI (i.e., the target view URI) mapped in the rendered view definition to the view component that was activated in step 802. View controller 602 accesses table 700 to read the URL that is mapped to the view URI. File system 612 is accessed to read the view definition at the URL, which is then forwarded to mobile CRM client 606 as shown in 832 for rendering and display. Thereafter, the process ends.

FIG. 7A illustrates the example view table prior to mobile device 104 receiving the example contacts list view definition and the example Labron James contact view definition. FIG. 7B illustrates changes made by view controller 602 to the view table shown in FIG. 7A in accordance with the process of FIG. 8 after mobile device 104 receives the example contacts view definition. Entry 5, which maps the view URI (i.e., view:\\contacts#list) for the example contacts list view definition and the URL (i.e., file: \\..contacts#list) for the example view definition stored in file system, illustrates the result of view controller 602 creating a new entry in accordance with step 820. Entries 6-9, which contain the target view URIs of the example contacts view definition, illustrates the result of view controller 602 creating new entries for target view URIs contained in the example contacts view definition.

FIG. 7C illustrates changes made by view controller 602 to the view table shown in FIG. 7B after the mobile device receives and processes the example Labron James contact view definition in accordance with the process of FIG. 8. As can be seen, entry 6 has been updated to include the URL where the LaBron James contact definition file is stored.

Figure 9:
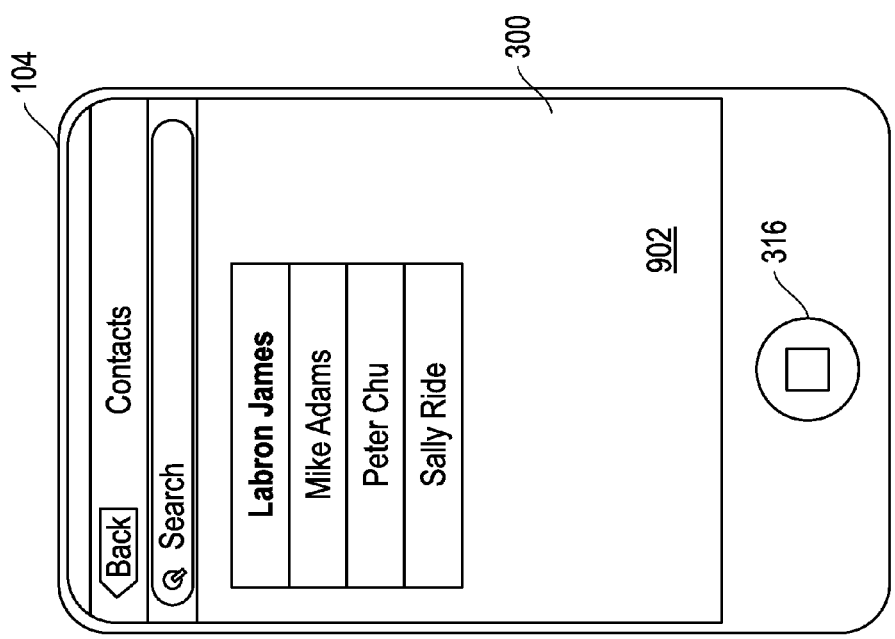
FIG. 9 graphically illustrates an example page displayed on a mobile device employed in FIG. 1.

With continuing reference to FIGS. 7C and 8, FIGS. 9 and 10 illustrate example views that are displayed by mobile device 104 when operating in the offline mode. Although not indicated in FIG. 7C, the file system of mobile device 104 stores a view definition for the springboard view shown in FIG. 3. This view definition can be rendered and displayed on mobile device 104 that is similar to that shown in FIG. 3 while mobile device 104 is in the offline mode. The user of mobile device 104 can activate the Contacts view component (see FIG. 3) of the springboard while mobile device 104 is in the offline mode. In response, the mobile CRM client 606 generates a request for the contacts view definition. This request will include the view URI (i.e., view:// contacts#list) that is linked to the contacts view component within the rendered springboard view definition. Since mobile device 104 is offline, request handler 604 will forward the request from the mobile CRM client to the view controller 602 in accordance with the process shown in FIG. 8. In response, view controller 602 accesses view table 700 shown in FIG. 7C to read the URL (i.e., file:\\..contacts#list) that is mapped to the view URI (i.e., view://contacts#list) of the request. View controller 602 initiates a process to retrieve the contacts view definition stored at the mapped URL, which is eventually forwarded to mobile CRM client 606 for rendering and display. In one embodiment, however, before the view definition is forwarded to the mobile CRM 602, view controller 602 can analyze the contacts view definition to identify which of its target view URIs, if any, are mapped to respective URLs in view table 700. View controller 602 can update the contacts view definition to indicate those target view URIs that are mapped to URLs within the view table before the view definition is sent to the mobile CRM client 606. Mobile CRM client 606 renders and displays the contacts view as shown in FIG. 9. When displaying the contacts view definition, mobile CRM client 606 will visually identify those view components that are actionable based upon corresponding target view URIs that were previously identified by view controller 602 as mapped to URLs. In one embodiment, view components that are actionable are bolded in the resulting view displayed by the mobile device 104. In the example shown in FIG. 9, the LaBron James contact view component is bolded, thus indicating that this component is actionable in the offline mode.

Figure 10:
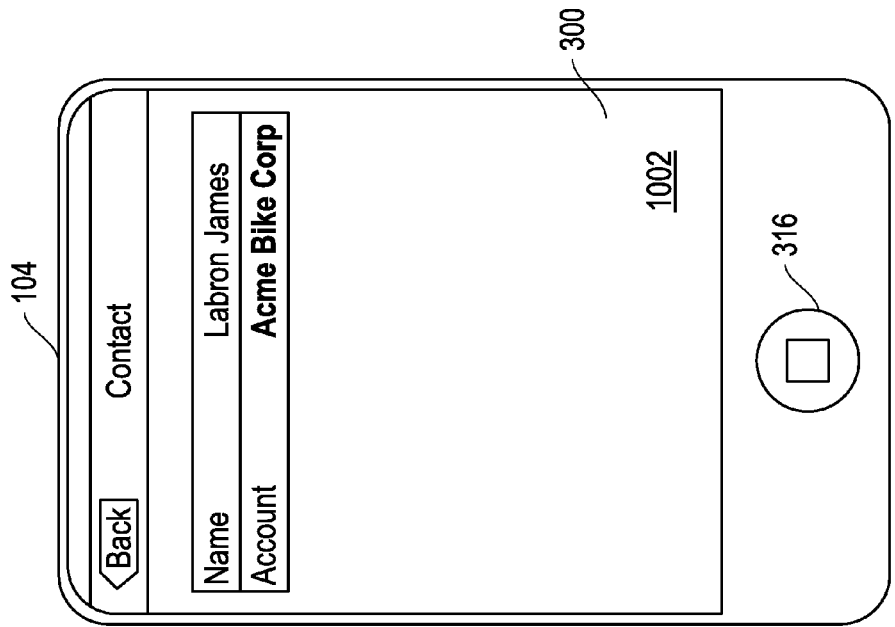
FIG. 10 graphically illustrates an example page displayed on a mobile device employed in FIG. 1.

In response to a user activating an actionable component such as the LaBron James component displayed in FIG. 9, the mobile CRM 606 acting in accordance with the process shown in FIG. 8 generates a view request for the LaBron James contact definition view. This request will include the view URI (i.e., view://contacts/101#detail) for the request contact view definition, which is linked to the "LaBron James" component within the contacts view definition rendered for display. Since mobile device 104 is offline, this request is provided to view controller 602, which in turn initiates a process that reads the LaBron James contact view from the file system definition at the mapped URL (i.e., file://..contacts/101#detail). The contact view definition is forwarded to the mobile CRM client for subsequent rendering and display. FIG. 10 illustrates the LaBron James contact view displayed by mobile device 104 while mobile device 104 is in the offline mode.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
   receiving a first view definition from a server via data communication link, wherein the first view definition comprises a first identifier;
   storing the first view definition in memory at a location identified by a first address;
   mapping the first address to the first identifier in a table;
   displaying a first view that corresponds to the first view definition;
   storing a second identifier of the first view definition in the table;

receiving a second view definition from the server via the communication link, wherein the second view definition comprises the second identifier;
storing the second view definition in the memory at a location identified by a second address;
mapping the second address to the second identifier in the table;
selecting first view components based on a first page definition;
merging the first view components with the first page definition to create a first result;
generating the first and second identifiers based on metadata of the first page definition;
adding the first and second identifiers to the first result to directly or indirectly generate the first view definition;
selecting second view components based on a second page definition;
merging the second view components with the second page definition to create a second result;
generating the second identifier based on metadata of the first page definition;
adding the first and second identifiers to the second result to directly or indirectly generate the second view definition.

2. The method of claim 1 further comprising a mobile device displaying a second view that corresponds to the second view definition.

3. The method of claim 1 wherein the second view is received by a mobile device in response to user activation of the actionable view component.

4. The method of claim 1 wherein the first identifier is a view Uniform Resource Identifier, and wherein the second identifier is a target view Uniform Resource Identifier.

5. The method of claim 4 further comprising:
identifying one or more target view Uniform Resource Identifiers of the view Uniform Resource Identifier to be mapped to addresses in the table.

6. The method of claim 5 wherein the adding of the first and second identifiers to the first result to directly or indirectly generate the first view definition comprises updating the first view definition to indicate the identified target view Uniform Resource Identifiers.

7. A memory storing instructions, wherein a mobile device implements a method in response to executing the instructions, the method comprising:
receiving a first view definition from a server via data communication link, wherein the first view definition comprises a first identifier;
storing the first view definition in memory at a location identified by a first address;
mapping the first address to the first identifier in a table;
displaying a first view that corresponds to the first view definition;
storing a second identifier of the first view definition in the table;
receiving a second view definition from the server via the communication link, wherein the second view definition comprises the second identifier;
storing the second view definition in the memory at a location identified by a second address;
mapping the second address to the second identifier in the table;
selecting first view components based on a first page definition;
merging the first view components with the first page definition to create a first result;
generating the first and second identifiers based on metadata of the first page definition;
adding the first and second identifiers to the first result to directly or indirectly generate the first view definition;
selecting second view components based on a second page definition;
merging the second view components with the second page definition to create a second result;
generating the second identifier based on metadata of the first page definition;
adding the first and second identifiers to the second result to directly or indirectly generate the second view definition.

8. The memory of claim 7 wherein the first identifier is a view Uniform Resource Identifier, and wherein the second identifier is a target view Uniform Resource Identifier.

9. The memory of claim 8 wherein the method further comprises:
identifying one or more target view Uniform Resource Identifiers of the view Uniform Resource Identifier to be mapped to addresses in the table.

10. The memory of claim 7 wherein the method further comprises the mobile device displaying a second view that corresponds to the second view definition.

11. The memory of claim 7 wherein the second view is received by the mobile device in response to user activation of the actionable view component.

12. The memory of claim 9 wherein the adding of the first and second identifiers to the first result to directly or indirectly generate the first view definition comprises updating the first view definition to indicate the identified target view Uniform Resource Identifiers.

13. A computer readable memory storing instructions, wherein a computer system implements a method in response to executing the instructions, the method comprising:
selecting a first page definition based on a request received from a mobile device;
transmitting a first view definition to the mobile device, wherein the mobile device implements a method, the method comprising:
receiving a first view definition from a server via data communication link, wherein the first view definition comprises a first identifier;
storing the first view definition in memory at a location identified by a first address;
mapping the first address to the first identifier in a table;
displaying a first view that corresponds to the first view definition;
storing a second identifier of the first view definition in the table;
receiving a second view definition from the server via the communication link, wherein the second view definition comprises the second identifier;
storing the second view definition in the memory at a location identified by a second address;
mapping the second address to the second identifier in the table;
selecting first view components based on a first page definition;
merging the first view components with the first page definition to create a first result;
generating the first and second identifiers based on metadata of the first page definition;
adding the first and second identifiers to the first result to directly or indirectly generate the first view definition;

selecting second view components based on a second page definition;

merging the second view components with the second page definition to create a second result;

generating the second identifier based on metadata of the first page definition;

adding the first and second identifiers to the second result to directly or indirectly generate the second view definition.

14. The computer readable memory of claim 13, wherein the first identifier is a view Uniform Resource Identifier, and wherein the second identifier is a target view Uniform Resource Identifier.

15. A method comprising:

transmitting instructions to a mobile for storage in memory thereof, wherein the mobile device is configured to implement a mobile device method in response to executing the instructions, the mobile device method comprising:

receiving a first view definition from a server via data communication link, wherein the first view definition comprises a first identifier;

storing the first view definition in memory at a location identified by a first address;

mapping the first address to the first identifier in a table;

displaying a first view that corresponds to the first view definition;

storing a second identifier of the first view definition in the table;

receiving a second view definition from the server via the communication link, wherein the second view definition comprises the second identifier;

storing the second view definition in the memory at a location identified by a second address;

mapping the second address to the second identifier in the table;

selecting first view components based on a first page definition;

merging the first view components with the first page definition to create a first result;

generating the first and second identifiers based on metadata of the first page definition;

adding the first and second identifiers to the first result to directly or indirectly generate the first view definition;

selecting second view components based on a second page definition;

merging the second view components with the second page definition to create a second result;

generating the second identifier based on metadata of the first page definition;

adding the first and second identifiers to the second result to directly or indirectly generate the second view definition.

16. The method of claim 15 wherein the first identifier is a view Uniform Resource Identifier, and wherein the second identifier is a target view Uniform Resource Identifier.

17. The method of claim 16 wherein the mobile device method further comprises:

identifying one or more target view Uniform Resource Identifiers of the view Uniform Resource Identifier to be mapped to addresses in the table.

18. The method of claim 15 wherein the mobile device method further comprises displaying a second view that corresponds to the second view definition.

19. The method of claim 15 wherein the second view is received by the mobile device in response to user activation of the actionable view component.

20. The method of claim 17 wherein the adding of the first and second identifiers to the first result to directly or indirectly generate the first view definition comprises updating the first view definition to indicate the identified target view Uniform Resource Identifiers.

* * * * *

UNITED STATES PATENT AND TRADEMARK OFFICE
CERTIFICATE OF CORRECTION

PATENT NO. : 9,760,897 B2
APPLICATION NO. : 14/068298
DATED : September 12, 2017
INVENTOR(S) : Carter et al.

It is certified that error appears in the above-identified patent and that said Letters Patent is hereby corrected as shown below:

In the Specification

In Column 1, Line 8, delete "61/880,892," and insert -- 61/880,898, --, therefor.

In Column 5, Line 62, delete "CMR" and insert -- CRM --, therefor.

Signed and Sealed this
Twenty-second Day of May, 2018

Andrei Iancu
*Director of the United States Patent and Trademark Office*